(12) United States Patent
Gearhart et al.

(10) Patent No.: US 9,137,203 B2
(45) Date of Patent: Sep. 15, 2015

(54) CENTRALIZED SECURE OFFLOAD OF CRYPTOGRAPHIC SECURITY SERVICES FOR DISTRIBUTED SECURITY ENFORCEMENT POINTS

(75) Inventors: Curtis M. Gearhart, Raleigh, NC (US); Christopher Meyer, Cary, NC (US); Linwood H. Overby, Jr., Raleigh, NC (US); David J. Wierbowski, Owego, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1309 days.

(21) Appl. No.: 11/626,513

(22) Filed: Jan. 24, 2007

(65) Prior Publication Data

US 2008/0175382 A1     Jul. 24, 2008

(51) Int. Cl.
*H04L 29/06* (2006.01)
*G06F 15/16* (2006.01)

(52) U.S. Cl.
CPC ............ *H04L 63/0209* (2013.01); *H04L 63/04* (2013.01); *H04L 63/0485* (2013.01); *H04L 2209/76* (2013.01)

(58) Field of Classification Search
CPC ............ H04L 63/0209; H04L 63/0485; H04L 2209/76; H04L 63/04
USPC ...................................... 713/153; 726/11, 12
See application file for complete search history.

(56) References Cited

U.S. PATENT DOCUMENTS

| | | | |
|---|---|---|---|
| 5,991,519 A | 11/1999 | Benhammou et al. | |
| 7,055,027 B1 * | 5/2006 | Gunter et al. ................. | 713/151 |
| 7,073,066 B1 * | 7/2006 | Nessett ......................... | 713/181 |
| 7,702,901 B2 * | 4/2010 | Ferguson ...................... | 713/153 |
| 8,352,725 B1 * | 1/2013 | O'Toole, Jr. .................. | 713/151 |
| 2002/0099823 A1 * | 7/2002 | Jemes et al. .................. | 709/225 |
| 2002/0112167 A1 * | 8/2002 | Boneh et al. .................. | 713/182 |
| 2002/0178355 A1 | 11/2002 | D'Sa et al. | |
| 2003/0097590 A1 * | 5/2003 | Syvanne ...................... | 713/201 |
| 2003/0126468 A1 * | 7/2003 | Markham ..................... | 713/201 |
| 2003/0177386 A1 * | 9/2003 | Cuomo et al. ............... | 713/201 |

(Continued)

OTHER PUBLICATIONS

Foldoc. "server" (definition). Dec. 2003, <http://foldoc.org/server>.*

(Continued)

*Primary Examiner* — Michael Simitoski
(74) *Attorney, Agent, or Firm* — Cuenot, Forsythe & Kim, LLC

(57) ABSTRACT

Embodiments of the present invention address deficiencies of the art in respect to network security and provide a method, system and computer program product for centralized secure offload of key exchange services for distributed security enforcement points. In one embodiment, a data processing system for centralized secure offload of key exchange services for distributed security enforcement points can be provided. The system can include a security enforcement point controlling communication flows between devices in different less trusted zones of protection, and a security server communicatively coupled to the security enforcement point and hosting key exchange services disposed in a more trusted zone of protection. The security enforcement point can include an interface to the key exchange services and program code enabled to offload at least one portion of a key exchange through the interface to the key exchange services disposed in the more trusted zone of protection.

15 Claims, 2 Drawing Sheets

(56) References Cited

U.S. PATENT DOCUMENTS

| | | | |
|---|---|---|---|
| 2004/0049701 A1* | 3/2004 | Le Pennec et al. | 713/201 |
| 2004/0073806 A1* | 4/2004 | Zimmer | 713/189 |
| 2004/0151322 A1 | 8/2004 | Sovio et al. | |
| 2004/0210761 A1* | 10/2004 | Eldar et al. | 713/191 |
| 2004/0250126 A1* | 12/2004 | Buer et al. | 713/201 |
| 2005/0201555 A1* | 9/2005 | Yen et al. | 380/30 |
| 2006/0015935 A1* | 1/2006 | Dixon et al. | 726/11 |
| 2006/0041936 A1* | 2/2006 | Anderson et al. | 726/11 |
| 2006/0105740 A1* | 5/2006 | Puranik | 455/410 |
| 2006/0129652 A1* | 6/2006 | Petrovskaya | 709/208 |
| 2006/0149962 A1* | 7/2006 | Fountain et al. | 713/151 |
| 2007/0300069 A1* | 12/2007 | Rozas | 713/176 |
| 2008/0046714 A1* | 2/2008 | Suganthi et al. | 713/150 |
| 2013/0212707 A1* | 8/2013 | Donahue et al. | 726/29 |

OTHER PUBLICATIONS

Berson, Tom, et al. "Cryptography as a network service." Proceedings of the ISOC Network and Distributed System Security Symposium (NDSS). 2001.*

"processor." dictionary.cambridge.org. Cambridge University Press, 2014. Web. Sep. 9, 2014.*

"processor." IEEE 100 The Authoritative Dictionary of IEEE Standards Terms Seventh Edition, IEEE Std 100-2000 , vol., No., pp.,, 2000.*

"processor." Merriam-Webster.com. Merriam-Webster, 2014. Web. Sep. 9, 2014.*

* cited by examiner

CENTRALIZED SECURE OFFLOAD OF CRYPTOGRAPHIC SECURITY SERVICES FOR DISTRIBUTED SECURITY ENFORCEMENT POINTS

CROSS-REFERENCE TO RELATED APPLICATIONS

This application is related to U.S. application Ser. No. 11/626,458, filed on Jan. 24, 2007.

BACKGROUND OF THE INVENTION

1. Field of the Invention

The present invention relates to the field of network security and more particularly to the field of security services management for distributed security enforcement points.

2. Description of the Related Art

Internet security has increasingly become the focus of both corporate and home computer users who participate in globally accessible computer networks. In particular, with the availability and affordability of broadband Internet access, even within the small office home office environment, many computers and small computer networks enjoy continuous access to the Internet. Notwithstanding, continuous, high-speed access is not without its price. Specifically, those computers and computer networks which heretofore had remained disconnected from the security risks of the Internet now have become the primary target of malicious Internet crackers and script kiddies, collectively referred to as "malicious intruders".

Notably, many such unauthorized intruders continuously scan the Internet for Internet Protocol (IP) addresses and ports of vulnerable computers communicatively linked to the Internet. At the minimum, those vulnerable computers can experience nuisance damage such as unauthorized file access, file deletion or file modification or defaced Web pages. Yet, at the other extreme, for the unsuspecting end-user their computer can become the staging area for "zombies" with which more malicious attacks can be launched resulting in the crippling of segments of the Internet. Of note, damage can result not only from the external actions of a malicious intruder, but also from the unsuspecting and unintentional actions of an internal, authorized user who either has accessed the assigned authorization to that user, or who unsuspectingly has become the proxy for an external, malicious force.

To combat the threat of malicious hacking, information technologies have devised complicated computing architectures designed to selectively limit access to different network resources according to the type of resource accessed and the identity of the user attempting access to the resource. Generally, network security measures deployed to combat malicious hacking can be broadly grouped into perimeter defenses, end-point defenses and intermediate security enforcement points. Perimeter defenses typically refer to firewall and other restrictive technologies deployed at the perimeter of the network. By comparison, end-point defenses generally refer to application level, client-side mechanisms such as client-side anti-virus software and software implemented personal firewalls.

Security enforcement points form the balance of the requisite security measures within a computing network. Security enforcement points refer to network mechanisms including gateway mechanisms within the network that separate a less-trusted portion or zone of the network from a more-trusted portion or zone of the network. Typically, security enforcement points are implemented in network and host infrastructure according to tiers of layers. The layering approach of the tiered architecture is intended to isolate certain services from direct exposure to users of the services based upon the sensitivity of the data exposed within the tier and the perceived risk of exposure from a set of users.

While data can be protected by a conventional tiering approach, security enforcement points with sensitive data relating to security often are located in relatively hostile zones in the network. In addition, as security enforcement points can be aggregation points for traffic, continuous availability of the systems in these relatively hostile zones can be critical. Finally, in order to control the operation of the network and to receive management data such as security events, one or more management nodes in relatively secure zones that have direct connectivity must all maintain an awareness of the multitude of security enforcement points and also must have direct connectivity to the security enforcement points—even those in hostile zones.

BRIEF SUMMARY OF THE INVENTION

Embodiments of the present invention address deficiencies of the art in respect to network security and provide a novel and non-obvious method, system and computer program product for centralized secure offload of cryptographic security services for distributed security enforcement points. In one embodiment, a data processing system for centralized secure offload of cryptographic security services for distributed security enforcement points can be provided. The system can include a security enforcement point controlling communication flows between devices in different less trusted zones of protection, and a security server communicatively coupled to the security enforcement point and hosting cryptographic security, including for example public key/private key exchange services, disposed in a more trusted zone of protection. The security enforcement point can include an interface to the cryptographic security services and program code enabled to offload at least one portion of cryptographic security services through the interface to the cryptographic security services disposed in the more trusted zone of protection.

In another embodiment of the invention, a method for centralized secure offload of cryptographic security services for distributed security enforcement points can be provided. The method can include initiating a key exchange in a less trusted zone of protection with a responder, offloading a portion of the key exchange to logic disposed in a more trusted zone of protection, and completing the key exchange in the less trusted zone of protection. The method further can include responding in a less trusted zone of protection to a request to initiate a key exchange with an initiator, offloading a portion of the key exchange to logic disposed in a more trusted zone of protection, and completing the key exchange in the less trusted zone of protection.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for centralized secure offload of cryptographic security services for distributed security enforcement points. In accordance with an embodiment of the present invention, the logic for performing critical portions of cryptographic security services for a security enforcement point in a network topology can be separated from the security enforcement point within different zones of protection, albeit the security enforcement point can be communicatively coupled to the logic over a private or secure connection. The security enforcement point can be disposed within a less trusted zone of protection, whereas the logic can be disposed within a more trusted zone of protection. In this way, critical information utilized in performing critical portions of cryptographic security, such as key exchange, can remain in a trusted zone of protection to provide a higher level of security.

Figure 1:
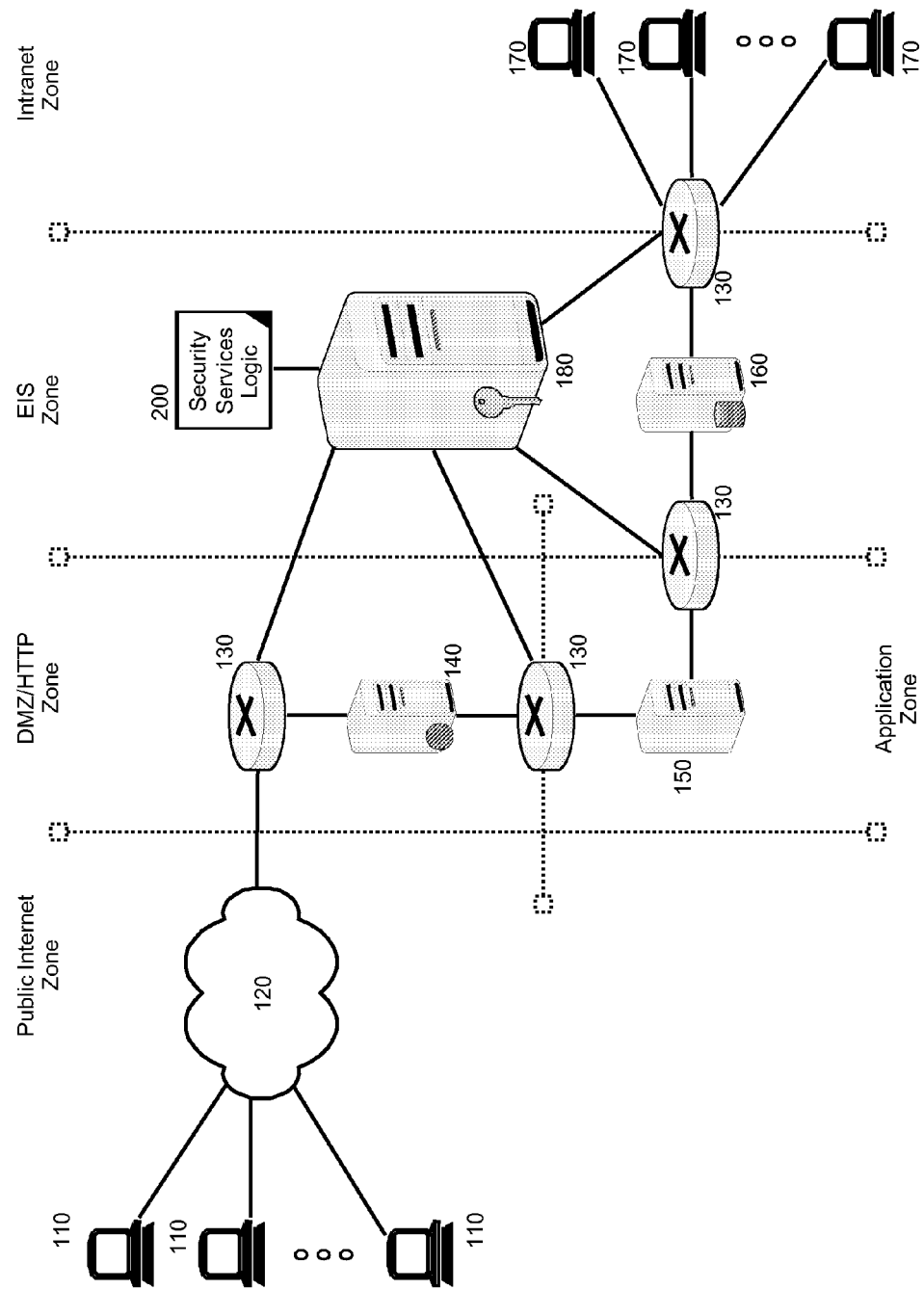
FIG. 1 is a schematic illustration of a network architecture configured for centralized secure offload of cryptographic security services for distributed security enforcement points; and, FIG. 2 is an event diagram illustrating a process for centralized secure offload of cryptographic security services for distributed security enforcement points.

In illustration, FIG. 1 depicts a network architecture configured for the centralized secure offload of cryptographic security services for distributed security enforcement points. As shown in FIG. 1, the network architecture can include multiple zones of protection ranging from a public Internet zone to an Intranet zone. The zones of protection also can include a demilitarized zone, an application zone and an enterprise information system (EIS) zone. The public Internet zone of protection can provide a less trusted zone of protection, whereas the EIS zone of protection and the Intranet zone of protection can provide a more trusted zone of protection, as it is well-known in the art.

The public Internet zone of protection can abut the demilitarized zone of protection such that computing clients 110 in the public computing space can establish communicative sessions with a content server 140 over a global computer communications network 120, for example the global Internet. A security enforcement point 130, however, can be disposed in the path of communications between the clients 110 and the content server 140 so as to monitor, regulate and limit communications flowing between the clients 110 and the content server 140. In this regard, the security enforcement point can include security enforcement logic configured to requisition security services for monitoring, regulating, and limiting the communications flowing between the clients 110 and the content server 140.

The content server 140 further can be coupled to one or more application servers 150 in an application zone of protection. The application servers 150 (only a single application server shown for the sake of illustrative simplicity), can provide application logic accessible through a user interface provided by the content server 140. As before, a security enforcement point 130 can be disposed in the path of communications between the content server 140 and the application servers 150 and can include security enforcement logic configured to requisition security services for monitoring, regulating, and limiting the communications flowing between the content server 140 and the application servers 150.

The application servers 150 can be coupled to one or more data servers 160 providing enterprise information services within an EIS zone of protection. The data servers 160 can provide entity information services and can range from a basic database that can be queried by logic executing within the application servers 150, to complete information systems that can be accessed by logic executing within the application servers 150. Again, a security enforcement point 130 can be disposed in the path of communications between the application servers 150 and the data servers 160 and can include security enforcement logic configured to requisition security services for monitoring, regulating, and limiting the communications flowing between the application servers 150 and the application servers 160.

The data servers 160 also can be coupled to internal Intranet clients 170 disposed in an Intranet zone of protection. The Intranet clients 170 can be viewed as more trustworthy than computing clients 110 and can access the services of the data servers 160 directly through a security enforcement point 130. Yet, as before, the security enforcement point 130 can include security enforcement logic configured to requisition security services for monitoring, regulating, and limiting the communications flowing between the Intranet clients 170 and the data servers 160.

Notably, one or more security servers 180 can be disposed in a more trusted zone of protection of the architecture, for instance, within the EIS zone of protection. The security servers 180 can be communicatively coupled to each of the security enforcement points 130 and can include security services logic 200. The security services logic 200 can include program code operable to monitor, to regulate and to limit communications flows through communicatively coupled security enforcement points, albeit the security services logic 200 resides within a different, more trusted zone of protection from that of coupled security enforcement points 130.

In this regard, a communications path can subsist between each security enforcement point 130 and the security services logic 200. As any of the security enforcement points 130 require security enforcement services for monitoring, regulating, or limiting communication flows through the security enforcement points 130, the security enforcement points 130 can offload the requisite security related services to the security services logic 200. The security related services within the security service logic 200 can be performed and results returned to the requesting security enforcement points 130. Thus, security enforcement points 130 can perform security services on transient communications flows while limiting the exposure of critical data utilized in performing security services.

Notably, the security related services within the security service logic 200 can include a cryptographic security service. As one example, a cryptographic security service includes a digital signature and verification service including logic for performing portions of a key exchange as defined in the Internet Key Exchange protocol (RFC 2409). The logic can include program code enabled to store certificates and private keys and to process requests in order to create and verify digital signatures on behalf of the security enforcement points. More specifically, those portions of key exchange can include the creation of a digital signature. In this way, the certificate and associated private key can remain protected within the more trusted zone of protection, though the key exchange initiator or key exchange responder can be disposed in a less trusted zone of protection.

Specifically, the security enforcement points 130 can establish a secure session with the security service logic 200. Each of the security enforcement points 130 can authenticate itself to the security service logic 200. The authentication can range from a simple user identifier and password pair, or full secure sockets layer authentication. Once authenticated, the security enforcement points 130 can request the use of a certificate and key for authentication to a remote key exchange peer. Responsive to the request, a resource profile can be defined in the security server 180 to represent a managed system host certification. Thereafter, whenever the security enforcement points 130 request cryptographic services, an access control check can be performed against the resource profile to ensure that only the associated security enforcement point 130 are allowed access cryptographic services.

Figure 2:
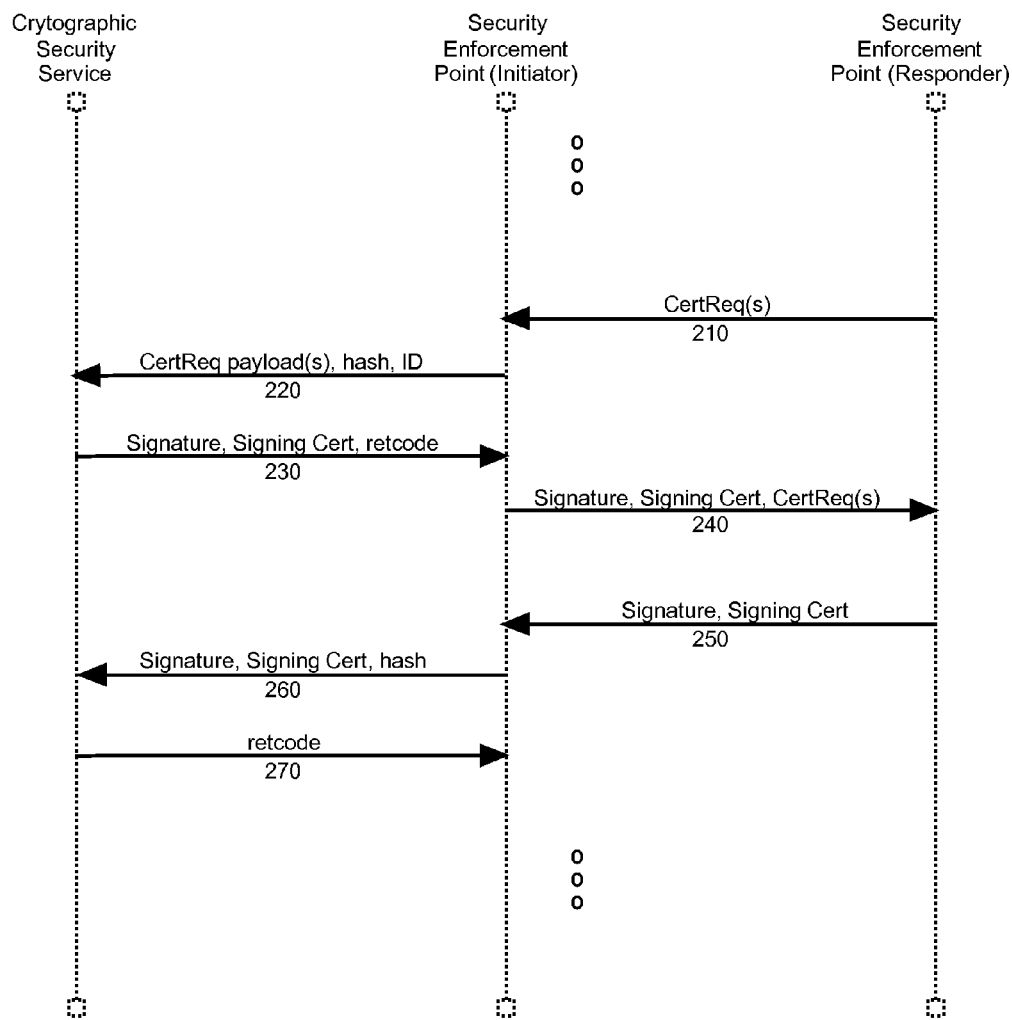

The cryptographic services provided by the security service logic 200 can include the creation of a digital signature in band during security association negotiation. In more particular illustration, FIG. 2 is an event diagram illustrating a process for centralized secure offload of cryptographic services for distributed security enforcement points. In the exemplary flow shown in FIG. 2, the cryptographic services can be Internet Key Exchange (IKE) signature mode services. In IKE signature mode services, two security enforcement points can negotiate an IKE security association in the course of which, in path 210, a security enforcement point responder can request the creation of a digital signature. In response, a security enforcement point initiator can offload the creation of a digital signature to a cryptographic security service in the security service logic in a different and more trusted zone of protection.

Specifically, in path 220, the security enforcement point can forward to the cryptographic security service a list of certificate authorities acceptable to the IKE peer, the IKE identifier of the security enforcement point, and a hash to sign. In path 230, the cryptographic security service, in turn, can return a digital signature (formed from the use of the hash on a private key associated with the identifier), along with a signing certificate and a return status indicating the success or failure of the operation. Thereafter, in path 240 the security enforcement point initiator can forward the signature, signing certificate and the request to the security enforcement point responder.

In path 250, the security enforcement point responder can reply to the security enforcement point initiator with a request to validate the signature and the signing certificate. As with the signature creation, the security enforcement point initiator can offload the digital signature validation portion of the IKE security association negotiation process to the cryptographic security service. In this regard, the security enforcement point initiator in path 260 can provide the signature, signing certificate and hash to the cryptographic security service. In response, in path 270, the cryptographic security service can return to the security enforcement point initiator a return code indicating the validity of the signature and signing certificate. In this case, the trusted certificate authority hierarchy remains accessible to the cryptographic security service in the more trusted zone of protection rather than the security enforcement point in the less trusted zone or protection in order to provide an enhanced level of security in the IKE security association negotiation process.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer-implemented method within and by a security enforcement point located between a first zone of protection and a second zone of protection, comprising:
controlling communication flows between a device in the first zone and a device in the second zone;
performing a cryptographic security service on the communication flows; and
offloading a portion of the cryptographic security service to a security server in a third zone of protection, wherein the third zone of protection is
disposed separately from the first and second zones of protection and
a higher zone of protection than the first and second zones of protection,
wherein the security server is connected to a plurality of security enforcement points and the security enforcement points define the boundaries of the zones.

2. The method of claim 1, further comprising:
establishing a secure session with the security server prior to the offloading.

3. The method of claim 1, wherein
the first zone is a public internet zone,
the second zone is a demilitarized zone, and
the third zone is an enterprise information system zone.

4. The method of claim 1, wherein
the first zone is a demilitarized zone,
the second zone is an application zone including an application server, and
the third zone is an enterprise information system zone.

5. The method of claim 1, wherein
the cryptographic security service includes key public/private key services.

6. A security enforcement point located between a first zone of protection and a second zone of protection, comprising:
at least one processor, wherein the at least one processor is configured to perform:
controlling communication flows between a device in the first zone and a device in the second zone;
performing a cryptographic security service on the communication flows; and
offloading a portion of the cryptographic security service to a security server in a third zone of protection, wherein
the third zone of protection is
disposed separately from the first and second zones of protection and;
a higher zone of protection than the first and second zones of protection,
wherein the security server is connected to a plurality of security enforcement points and the security enforcement points define the boundaries of the zones.

7. The system of claim 6, wherein the at least one processor is further configured to initiate and/or perform:
establishing a secure session with the security server prior to the offloading.

8. The system of claim 6, wherein
the first zone is a public internet zone,
the second zone is a demilitarized zone, and
the third zone is an enterprise information system zone.

9. The system of claim 6, wherein
the first zone is a demilitarized zone,
the second zone is an application zone including an application server, and
the third zone is an enterprise information system zone.

10. The system of claim 6, wherein
the cryptographic security service includes key public/private key services.

11. A computer program product, comprising:
a computer usable storage device having stored therein computer-readable program code, which when executed by a computer hardware system including a security enforcement point located between a first zone of protection and a second zone of protection, causes the security enforcement point to perform:
controlling communication flows between a device in the first zone and a device in the second zone;
performing a cryptographic security service on the communication flows; and
offloading a portion of the cryptographic security service to a security server in a third zone of protection, wherein
the third zone of protection is
disposed separately from the first and second zones of protection and
a higher zone of protection than the first and second zones of protection,
wherein the computer usable storage device is not a transitory, propagating signal per se and
wherein the security server is connected to a plurality of security enforcement points and the security enforcement points define the boundaries of the zones.

12. The computer program product of claim 11, wherein the computer-readable program code further causes the security enforcement point to perform:
establishing a secure session with the security server prior to the offloading.

13. The computer program product of claim 11, wherein
the first zone is a public internet zone,
the second zone is a demilitarized zone, and
the third zone is an enterprise information system zone.

14. The computer program product of claim 11, wherein
the first zone is a demilitarized zone,
the second zone is an application zone including an application server, and
the third zone is an enterprise information system zone.

15. The computer program product of claim 11, wherein
the cryptographic security service includes key public/private key services.

* * * * *